(12) United States Patent
Bartoli et al.

(10) Patent No.: US 12,677,981 B2
(45) Date of Patent: Jul. 14, 2026

(54) SYSTEM FOR PREPARING BEVERAGES

(71) Applicant: SARONG SOCIETA' PER AZIONI, Reggiolo (IT)

(72) Inventors: Andrea Bartoli, Ameglia (IT); Davide Capitini, Ameglia (IT)

(73) Assignee: ALUPAK ITALIA S.R.L., Milan (IT)

( * ) Notice: Subject to any disclaimer, the term of this patent is extended or adjusted under 35 U.S.C. 154(b) by 773 days.

(21) Appl. No.: 18/010,384

(22) PCT Filed: Jun. 28, 2021

(86) PCT No.: PCT/IB2021/055753
§ 371 (c)(1),
(2) Date: Dec. 15, 2022

(87) PCT Pub. No.: WO2022/003529
PCT Pub. Date: Jan. 6, 2022

(65) Prior Publication Data
US 2023/0248176 A1     Aug. 10, 2023

(30) Foreign Application Priority Data

Jun. 29, 2020     (IT) ........................ 102020000015676

(51) Int. Cl.
*A47J 31/06* (2006.01)
*A47J 31/36* (2006.01)
(Continued)

(52) U.S. Cl.
CPC ....... *A47J 31/3676* (2013.01); *A47J 31/0668* (2013.01); *A47J 31/0684* (2013.01);
(Continued)

(58) Field of Classification Search
CPC ................ A47J 31/3676; A47J 31/0668; A47J 31/0684; A47J 31/362; A47J 31/3623;
(Continued)

(56) References Cited

U.S. PATENT DOCUMENTS

| | | | | | |
|---|---|---|---|---|---|
| 4,136,202 A | * | 1/1979 | Favre | ................. | B65D 85/8049 |
| | | | | | 426/77 |
| 2011/0011271 A1 | * | 1/2011 | Kollep | ................ | A47J 31/0668 |
| | | | | | 99/287 |

(Continued)

FOREIGN PATENT DOCUMENTS

| | | |
|---|---|---|
| EP | 1839543 B1 | 6/2008 |
| EP | 2367739 B1 | 4/2014 |

(Continued)

OTHER PUBLICATIONS

Internationall Search Report and Written Opinion dated Nov. 8, 2021 from counterpart International Patent Application No. PCT/IB2021/055753.

*Primary Examiner* — Tiffany T Tran
(74) *Attorney, Agent, or Firm* — SHUTTLEWORTH & INGERSOLL, PLC; Timothy J. Klima

(57) ABSTRACT

Described is a system for preparing beverages starting from a capsule (1) by injecting pressurised water comprising:
a dispensing machine (5) comprising an injection device for supplying water under pressure to the capsule (1), a housing element (501) configured to house the capsule (1) and a dispensing device for closing the housing element (501) in a closed configuration of the dispensing machine (5), wherein the housing element (501) comprises an annular sealing edge (502), which extends about an axis (Z) and is configured to contact the capsule (1) in the closed configuration; wherein the capsule (1) comprises a casing (2), which comprises a base wall (201) and a side wall (202) defining a cavity (203) containing an initial product to be added to water for obtaining the beverage, and a flanged edge (204) extending from said side wall (202); a covering element (3), fixed to the flanged edge (204) for closing the cavity (203); a sealing element, associated with the
(Continued)

flanged edge (204) for creating a fluidic seal with the sealing edge (502) in the closed configuration; wherein the sealing element is made as a cellulose-based annular body (401), for example it is made of paper or cardboard; and wherein the sealing edge (502) is provided with a plurality of radial open grooves (504) and radial crests (505) which in the closed configuration prior to dispensing penetrate, or contact, a sealing area (402) of the annular body (401), said grooves (504) and said crests (505) penetrating even more deeply into the sealing area (402) during dispensing, so as to improve the fluidic seal, when the annular body (401) is softened in contact with the water injected by the injection device.

16 Claims, 7 Drawing Sheets

(51) Int. Cl.

| | |
|---|---|
| *B32B 7/02* | (2019.01) |
| *B32B 7/12* | (2006.01) |
| *B32B 29/00* | (2006.01) |
| *B65D 85/804* | (2006.01) |

(52) U.S. Cl.
CPC .................. *B32B 7/02* (2013.01); *B32B 7/12* (2013.01); *B32B 29/005* (2013.01); *B65D 85/8046* (2013.01); *B65D 85/8064* (2020.05); *B32B 2307/718* (2013.01); *B32B 2307/728* (2013.01); *B32B 2307/7376* (2023.05); *B32B 2439/40* (2013.01); *B32B 2439/70* (2013.01)

(58) Field of Classification Search
CPC .......... B32B 7/02; B32B 7/12; B32B 29/005; B32B 2307/718; B32B 2307/728; B32B 2307/7376; B32B 2439/40; B32B 2439/70; B65D 85/8046; B65D 85/8064; Y02W 90/10
See application file for complete search history.

(56) References Cited

U.S. PATENT DOCUMENTS

| | | | |
|---|---|---|---|
| 2019/0062998 A1* | 2/2019 | Chen ....................... | D21H 17/59 |
| 2020/0385204 A1* | 12/2020 | Gort-Barten ........... | B65D 65/40 |

FOREIGN PATENT DOCUMENTS

| | | | |
|---|---|---|---|
| WO | 2009115474 A1 | 9/2009 |
| WO | 2019001995 A1 | 1/2019 |
| WO | 2019092144 A1 | 5/2019 |
| WO | 2020130818 A1 | 6/2020 |

* cited by examiner

SYSTEM FOR PREPARING BEVERAGES

This application is the National Phase of International Application PCT/IB2021/055753 filed Jun. 28, 2021 which designated the U.S.

This application claims priority to Italian Patent Application No. 102020000015676 filed Jun. 29, 2020, which applications are incorporated by reference herein.

This invention relates to a system for producing beverages starting from a capsule by injecting pressurised water.

More specifically, the invention relates to a system comprising a dispensing machine comprising a housing element in which the capsule can be housed, wherein the capsule is single-dose and single-use, and contains an initial product, for example such as coffee powder, which is able to make, interacting with pressurised water injected into the capsule, a final product, for example a coffee beverage.

The prior art capsules for use on dispensing machines are single-use and single-dose containers comprising an outer casing and having the shape of a glass or cup. The casing usually has a base wall and a lateral wall defining a cavity containing the initial product, for example ground coffee or tea, from which to obtain the final product, for example the beverage. A flanged edge extends from the lateral wall and is positioned around the cavity, on the opposite side relative to the base wall.

The cavity, at a relative opening, is hermetically sealed by a covering element, fixed to the flanged edge, in such a way as to seal the initial product inside the container.

A consumer can insert the capsule in a housing element of the dispensing machine when the machine is in an open configuration and then place the dispensing machine in the closed configuration, manually or by means of an automatic mode, in which a dispensing device closes the housing element and the capsule contained therein. When the machine is in the closed configuration, the flanged edge of the capsule is clamped between the housing element and the dispensing device.

After dispensing, the consumer can again return the machine to the open configuration to allow the capsule to detach from the housing element and automatically fall into the inner container dedicated to receiving the capsules already used.

During dispensing, the base wall of the capsule is perforated by an injection device for injecting liquid under pressure, for example water, into the cavity and obtain the final product whilst the covering element is perforated by the dispensing device to allow the final product to be dispensed.

The dispensing device in fact comprises a dispensing plate equipped with a plurality of sharp elements which, when the pressure of the fluid inside the capsule increases, engage with the covering element and perforate it in a plurality of different zones. The final product can flow into a use container through the holes formed by the dispensing device of the dispensing machine.

In order to achieve a successful dispensing, the capsule also comprises a sealing element positioned at the flanged edge which is configured to make a fluid-tight seal with the dispensing machine, in particular with the housing element of the dispensing machine. The latter comprises, in fact, a free sealing edge, which extends in an annular manner about an axis and is shaped in an undulating manner in the sense that it comprises a plurality of crests and grooves which alternate circumferentially.

The sealing element prevents an escape of the pressurised liquid at the high operating pressures of the dispensing machine and, in use, is compressed between the housing element of the dispensing machine and the dispensing plate of the dispensing device. An elastic element present in the dispensing machine between the housing element and the dispensing device makes it possible to keep the flanged edge clamped between them even during dispensing despite the pressure dispensed by the injection device.

There are numerous solutions, shown in numerous prior art patent documents, which show capsules, made of biodegradable or recyclable material, wherein the sealing element is a ring made of compostable material, for example it is made of a cellulose-based material, for example paperboard or natural fibres, to guarantee that the capsule has only compostable or entirely recyclable components.

Amongst these solutions, there are some prior patent documents which have for an object a capsule and a system for making a beverage, wherein, in order to keep the fluid-tight seal during the dispensing between the sealing element of the capsule and the housing element, the sealing element is made of a material which increases in volume when it is wetted by the water injected into the capsule.

Patent EP2367739 shows a system for preparing a beverage wherein a capsule can be inserted in a housing of the dispensing machine and the capsule includes a material which, after being wetted, expands, to form or reinforce the fluid-tight seal. When the dispensing machine is in the closed configuration and the capsule has been inserted in it, there is a poor sealing effect between a circumferential edge of the housing element and the capsule. However, as soon as pressurised water is injected, which is fed to the cavity, but is also enclosed by the housing element wetting the sealing element, the sealing element swells and thereby forms, or reinforces, the existing fluid-tight seal. The material with which the sealing element is made may be a biodegradable material, for example starch, or paperboard.

The international patent application WO2019092144 also shows a capsule comprising a casing made of aluminium and a sealing element made of a cellulose-based material wherein, during dispensing, the residual water present in the dispensing machine causes the swelling of the sealing element.

The technical aim which forms the basis of the invention is therefore to provide a system for making a beverage comprising a dispensing machine and a capsule which can be inserted in the machine, wherein the capsule comprises a cellulose-based sealing element, which overcomes the drawbacks of the prior art systems.

A further aim of the invention is to obtain a system alternative to the prior art systems, which makes it possible to reduce a percentage of defects in the dispensing, that is to say, the percentage of dispensing operations which are faulty compared with the total amount of dispensing operations performed, due to the fluid-tight seal between the dispensing machine and the beverage capsule.

Another different aim of the invention is to obtain a system which allows a good quality of extraction of the beverage.

These aims are achieved by a system according to the invention, comprising the technical features described in one or more of the appended claims.

Further features and advantages of the invention are more apparent from the non-limiting description which follows of a preferred, non-limiting embodiment of a capsule as illustrated in the accompanying drawings, in which.

Figure 2:
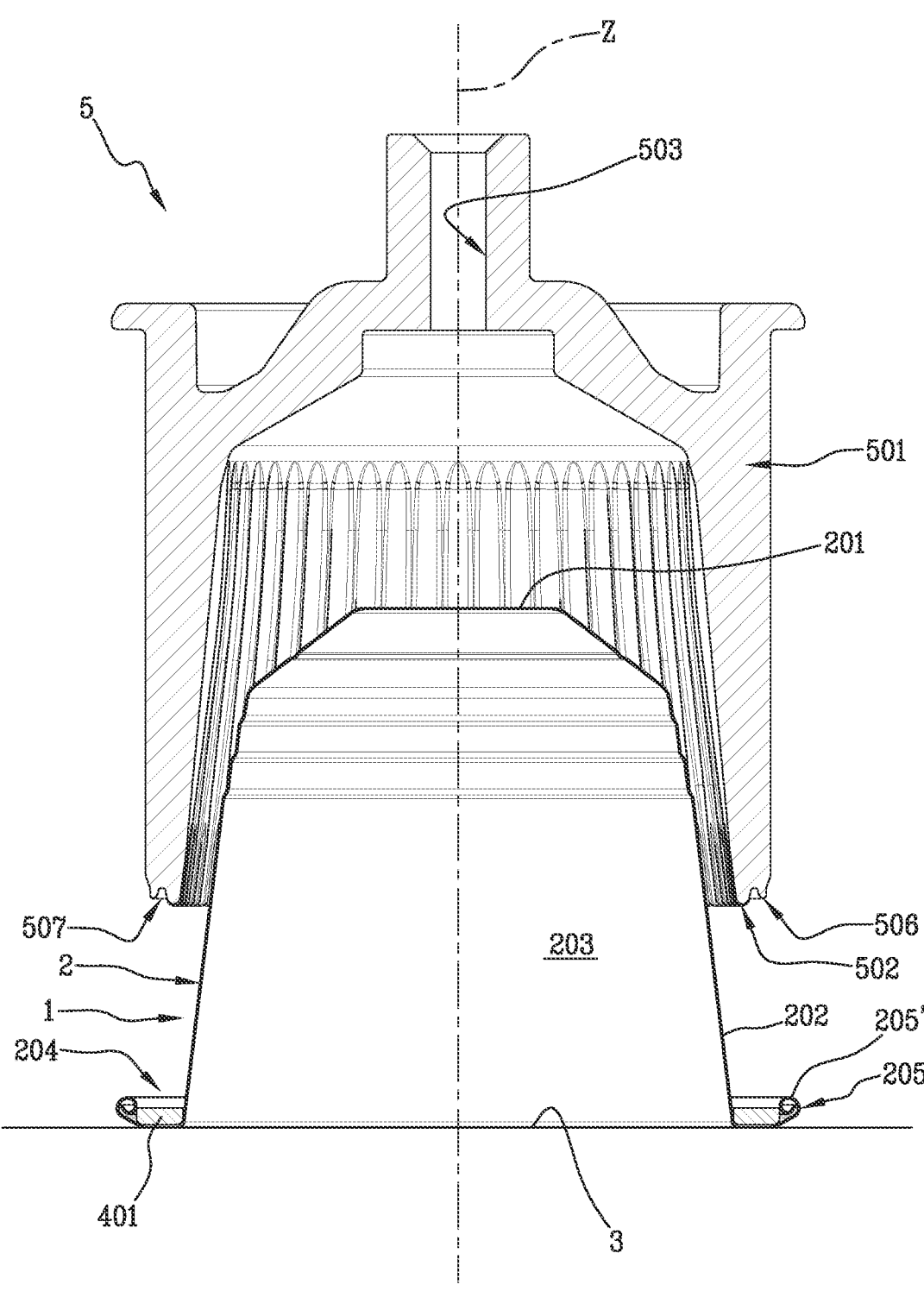
FIG. 2 shows a schematic cross-section of a system for making a beverage according to the invention, which comprises the dispensing machine of FIG. 1 and a capsule comprising a sealing element, in an open configuration which allows the insertion of the capsule in the housing element of the dispensing machine.
Figure 4:
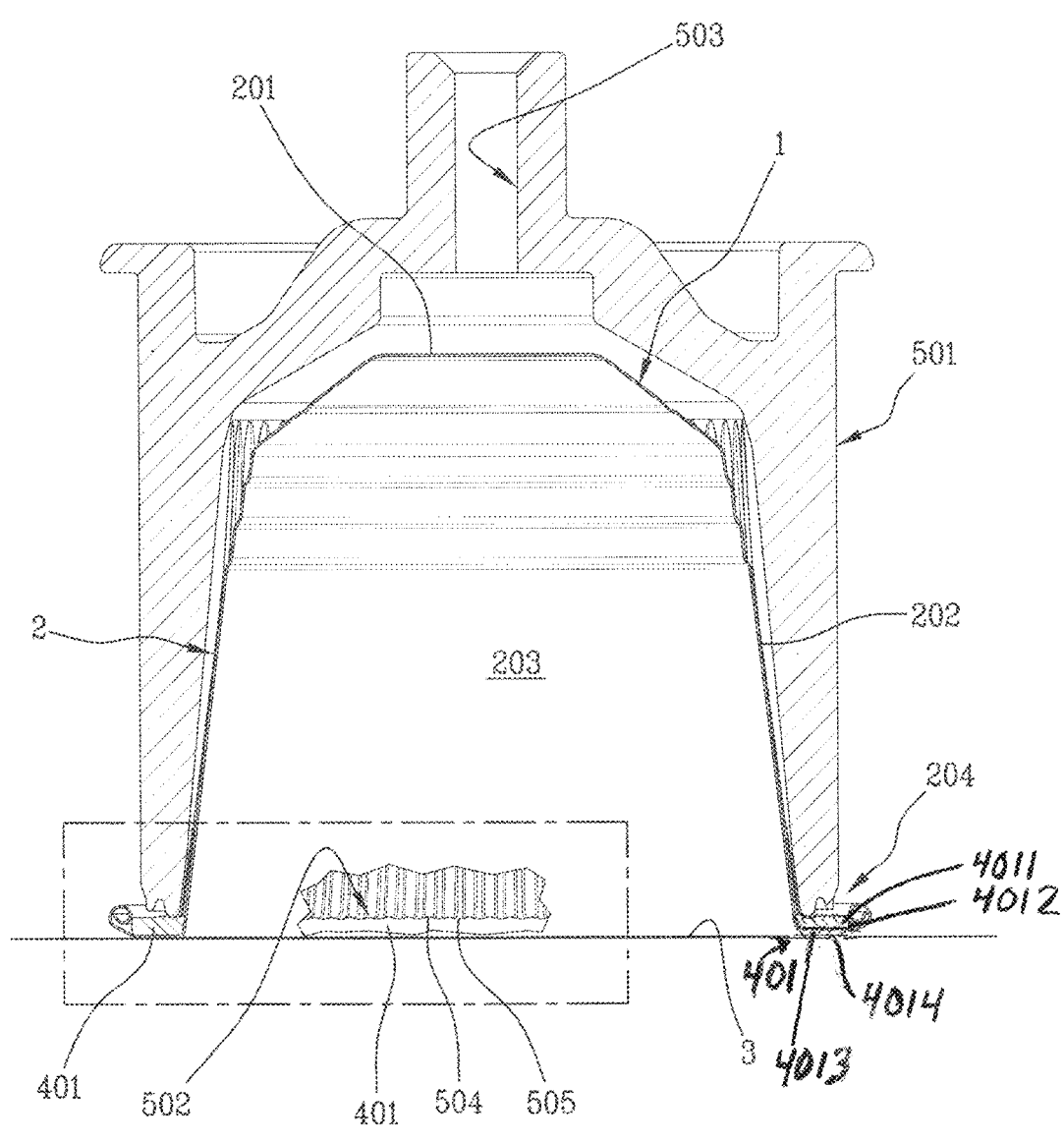
FIG. 4 shows a cross-section view of the system of FIG. 2, in the closed configuration, but before dispensing, in which the sealing edge penetrates, or comes into contact with, a sealing zone of the sealing element of the capsule, and wherein a detail is shown wherein the crests penetrate the sealing element and the grooves penetrate or make contact with the sealing edge.
Figure 4A:
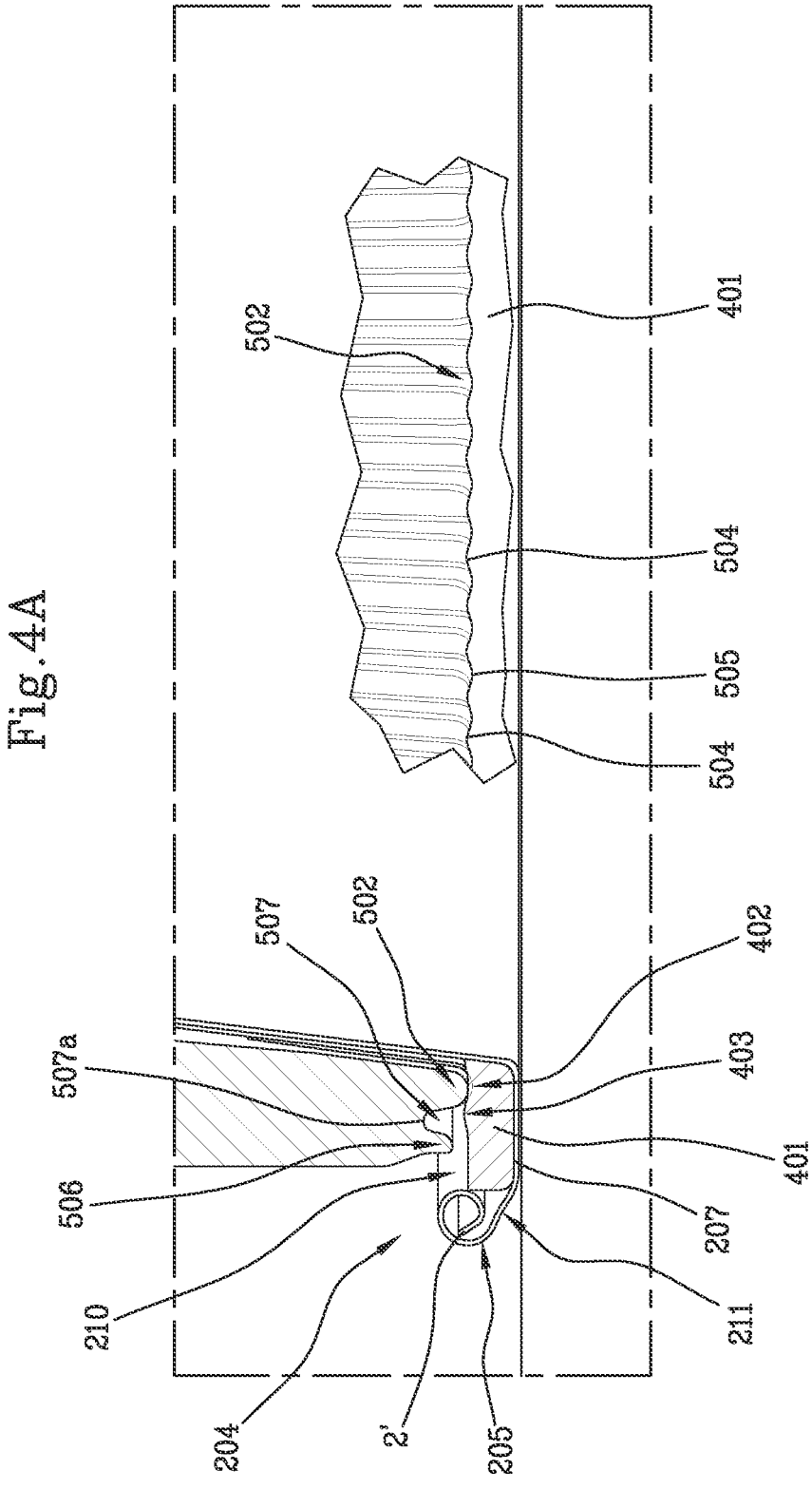
Figure 5:
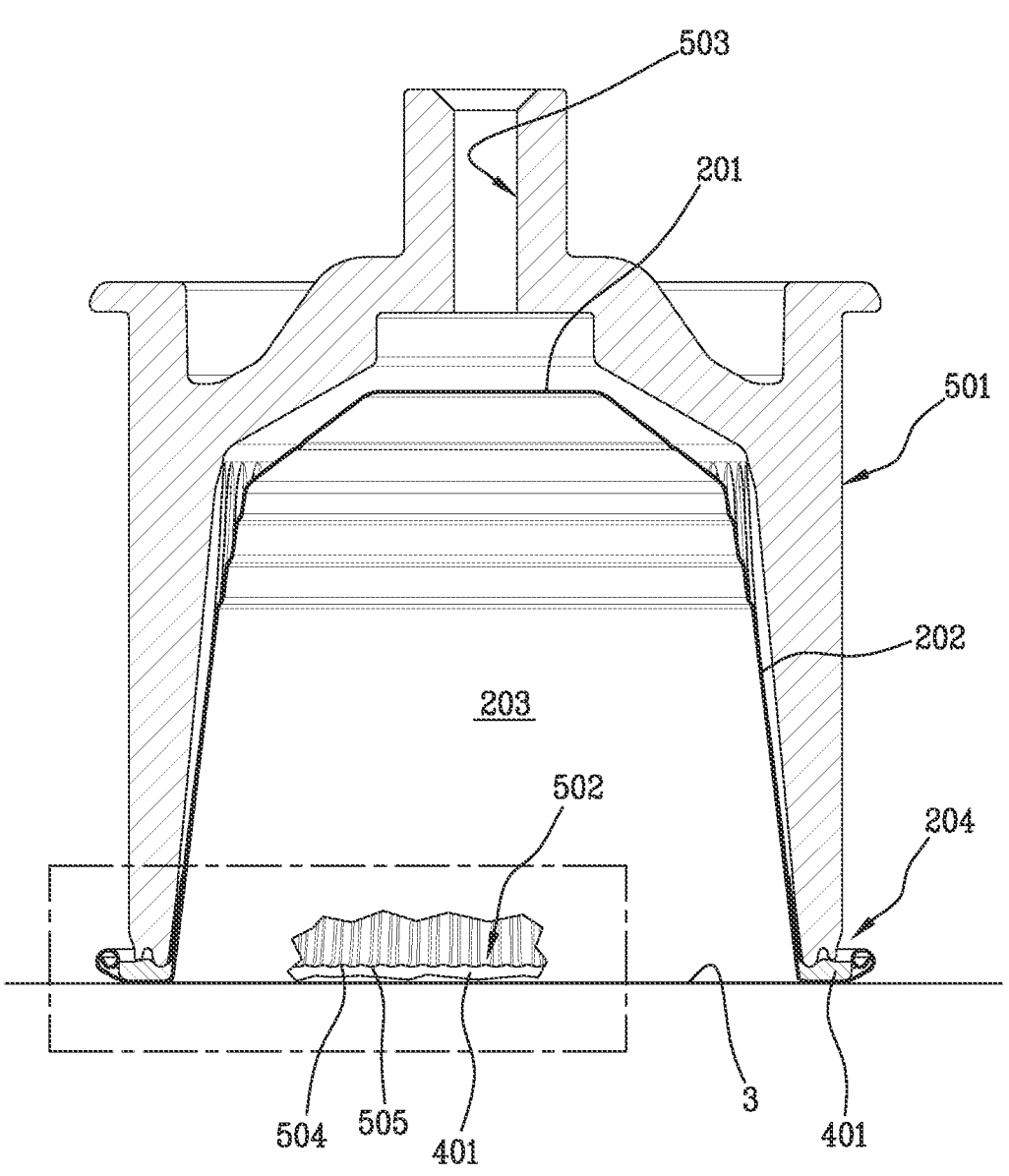
Figure 5A:
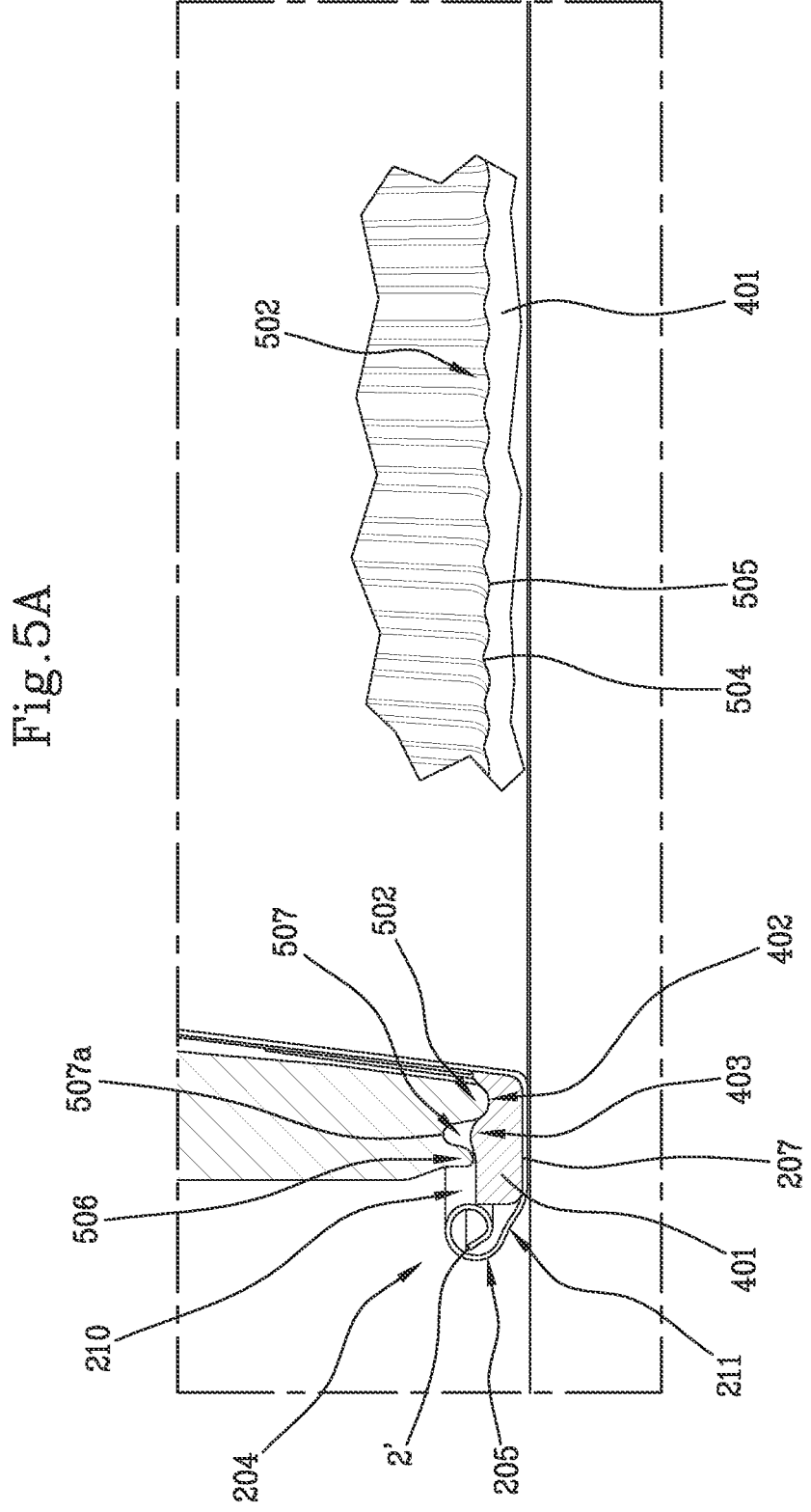

FIG. 4A shows an enlargement of the detail of FIG. 4, where it can be seen how when the sealing edge penetrates, or comes into contact with, the sealing element, the latter is compressed and acts in turn in a free annular zone, outside the sealing zone and surrounding the sealing zone, which is forced to deform by swelling due to the movement of the cellulose-based material from the sealing zone to the free zone;

FIG. 5 shows a cross-section view of the system of FIG. 2, in the closed configuration, but during dispensing, in which the sealing edge penetrates even more deeply in the sealing zone, and showing a detail wherein the crests and the grooves penetrate more deeply than the cross-section view of FIG. 4, when the sealing element softens in contact with the water;

FIG. 5A shows an enlargement of the detail of FIG. 5, in which it can be seen that the free zone is more swollen than FIG. 4A.

With reference to FIGS. 1 to 5A, the numeral 1 denotes a capsule which can be used in a system for making beverages by injecting pressurised water. The system comprises a dispensing machine 5, which in turn comprises an injection device, not illustrated, configured for supplying pressurised water to the capsule 1, a housing element 501 configured to house the capsule 1 and a dispensing device (not illustrated) for closing the housing element 501 in a closed configuration of the dispensing machine 5.

In fact, the dispensing machine 5 can be placed in an open configuration (FIG. 2), in which the housing element 501 can receive the capsule 1 from a consumer, and in the closed configuration, in which the capsule 1 is enclosed by the housing element 501 and is clamped between the housing element 501 and the dispensing device.

In order to continue to maintain the clamping of the capsule 1 also during the dispensing, when pressurised water is supplied to the capsule 1 by the injection device, the dispensing machine 5 comprises an elastic body (not illustrated) which in the closed configuration acts on the housing element 501 and is suitably designed to continue to maintain the closed configuration of the system at the pressures of use of the dispensing machine 5.

The housing element 501 comprises a sealing edge 502, which is annular, extends about an axis Z, and is configured to come into contact with the capsule 1 in the closed configuration. The axis Z is a central axis of symmetry for the housing element 501.

The capsule 1 comprises a casing 2 which has a longitudinal axis of extension, for example an axis of symmetry, which when the capsule 1 is inserted in the housing element 501 substantially coincides with the axis Z of the housing element 501.

The casing 2, as described in more detail below, is preferably made of aluminium, for example by drawing, and reference will be made to a casing 2 of this type. However, it should be noted that the casing 2 of the capsule 1 can also be chosen from among one of the following materials of a first list:

Polyolefin (preferably PP or PE), polyethylene terephthalate (PET), polystyrene (PS), polylactic acid (PLA), polyethylene furanoate (PEF);

Biodegradable and/or compostable materials different from PLA, for example of vegetable origin such as cellulose, or derived from them, for example, paper.

The casing 2 is substantially frustoconical in shape, that is to say, in the form of a glass or cup. The casing 2 includes a base wall 201 and a lateral wall 202, defining an open cavity 203, and a flanged edge 204, which extends from the lateral wall 202.

More in detail, the lateral wall 202 diverges from the base wall 201 up to one end, starting from which the flanged edge 204 extends in a substantially radial manner.

The cavity 203 is suitable for containing an initial product (not illustrated) to be joined to a fluid (not illustrated) to obtain a final product (not illustrated), for example a beverage. The fluid is, preferably, a hot or cold liquid under pressure, introduced in the cavity 203 in a step of injecting the fluid, to obtain the beverage.

As mentioned above, the initial product is, for example, a food product which is soluble, freeze-dried, dehydrated, concentrated, percolatable, in powder form—for example coffee, or chocolate; alternatively, the initial preparation can be, for example, a food product in leaf form—for example tea. The fluid is preferably water, hot and under pressure, which makes it possible to obtain a beverage, for example coffee, barley coffee, tea, or herbal tea.

The capsule 1 comprises a covering element 3, fixed to the flanged edge 204, so as to close the cavity 203. The covering element 3 may be fixed to the flanged edge 204 by thermal or ultrasound welding, or gluing, and is positioned on the opposite side relative to the base wall 201.

The injection device comprises three blades (not illustrated) configured for perforating the base wall 201 with respective cuts in the closed configuration and a central injection conduit 503, independent and separate from the blades, which is configured for feeding the pressurised fluid to the capsule 1.

The covering element 3 can be perforated by the dispensing device of the dispensing machine 5.

In fact, as already mentioned, the dispensing device of the dispensing machine 5 comprises a dispensing plate (not illustrated) equipped with a plurality of pointed elements configured for perforating the covering element 3 and obtaining in it a plurality of perforations when a pressure of the fluid inside the cavity 203 increases, in such a way that the beverage can flow through these perforations and be fed into a container to be picked up by the consumer.

When the machine is in the closed configuration, the flanged edge 204 of the capsule 1 is clamped between the housing element 501 and the dispensing device.

A sealing element is associated with the flanged edge 204 for making a fluid-tight seal with the dispensing machine 5, and that is to say with the sealing edge 502 of the dispensing machine 5.

More in detail, it is the sealing element of the flanged edge 204 to be clamped between the sealing edge 502 and the dispensing device.

The sealing element is shaped like an annular body 401, positioned on the base wall 201, which is made from a cellulose-based material and is therefore made as a ring made of paper, or paperboard, or natural fibres, or with a composition which comprises a combination of these materials.

For simplicity but without limiting the scope of the invention, the annular body 401 will be referred to as being cellulose-based, for example paper and/or paperboard.

Thanks to the fact that it comprises a cellulose-based annular body 401, the sealing element is easy to make.

If the casing 2 is made of aluminium, the flanged edge 204 may comprise an annular bead 205, which is positioned at an outer end of the flanged edge 204, as shown in the accompanying drawings.

Figures 3, 3A:
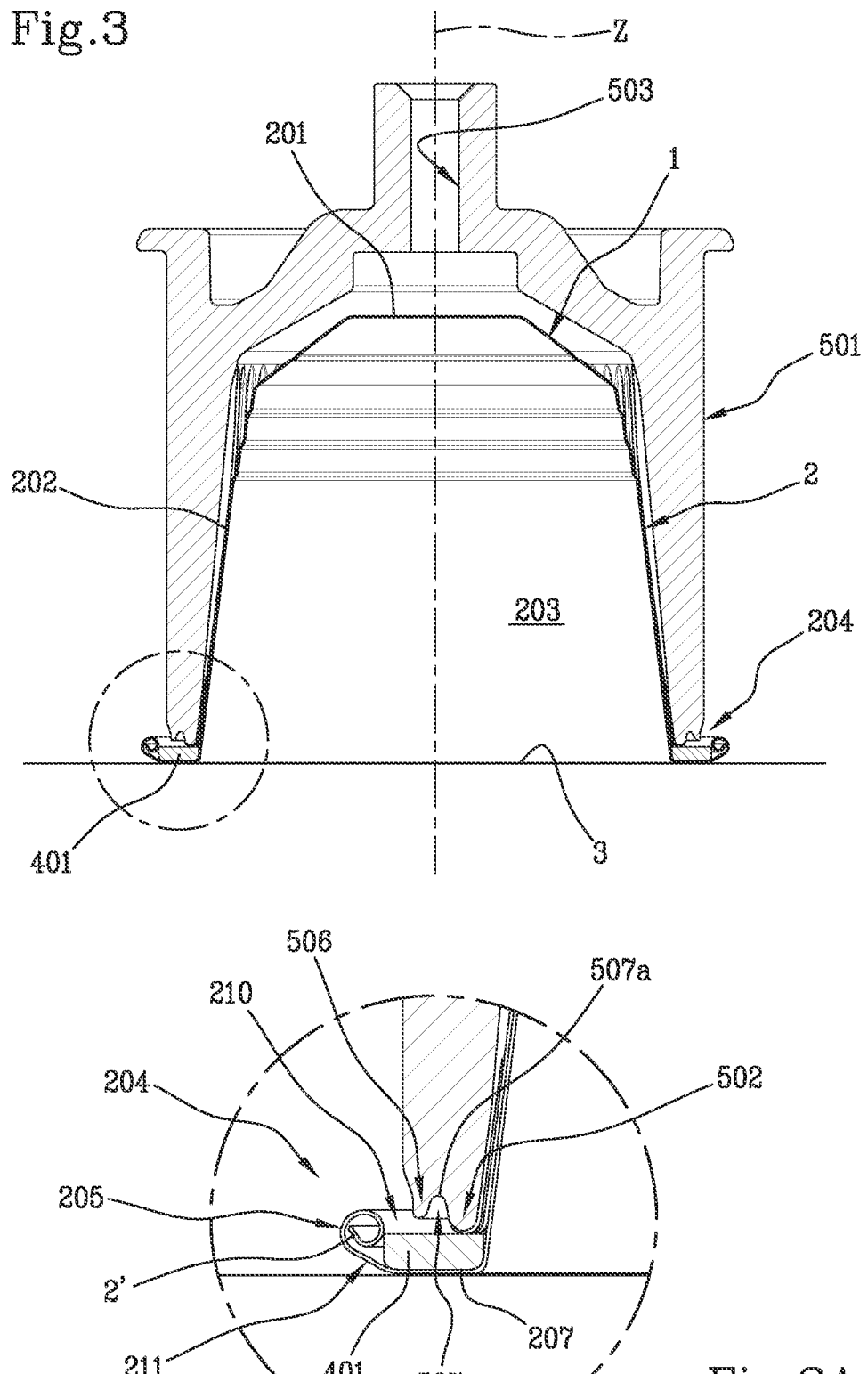
FIG. 3 shows a cross-section view of the system of FIG. 2, before being arranged in a closed configuration.
FIG. 3A shows an enlargement of the cross-section of FIG. 3, in which the sealing edge of the housing element is about to come into contact with the sealing element of the capsule.

A border 2' of the casing 2, shown in more detail in FIGS. 3A, 4A and 5A, is in effect folded in the annular bead 205 in such a way that it is positioned inside the annular bead 205.

The flanged edge 204 comprises a first portion 211 which comprises the annular bead 205 and a second portion 207 contiguous to the side wall 202, which is annular and lies in a first plane.

The first portion 211 is contained in a half-space, formed by the first plane and facing towards the base wall 201 and extends in a direction parallel to the axis Z towards the base wall 201 up to a free edge 205' (FIG. 2) of the annular bead 205.

The free edge 205' of the annular bead 205 is, in other words, the end closest to the base wall 201 of the annular bead 205.

Since the annular bead 205 represents the outer end of the flanged edge 204, the free edge 205' also represents the end of the first portion 211 closest to the base wall 201.

It may be noted that the first portion 211 is defined without discontinuities by the edge 2' of the casing 2 through the annular bead 205 to the second portion 207.

Between the first portion 211 and the lateral wall 202 facing it, there may therefore be a recess 210 in which is housed the annular body 401, the free edge 205' of the annular bead 205 being at a distance such that the first plane is greater than, or equal, to the thickness of the annular body 401, so that the recess 210 can contain entirely the annular body 401.

This allows the recess 210 to be defined in a simple and inexpensive manner.

If the casing 2 is, on the other hand, made, alternatively and in a manner not illustrated, of a material different from aluminium, for example it is made of PLA or a cellulose-based vegetable material, the annular bead 205 may be absent since the flanged edge 204 may be substantially planar and have only a projection at the relative end for the purposes of centring in the dispensing machine 5.

Figure 1:
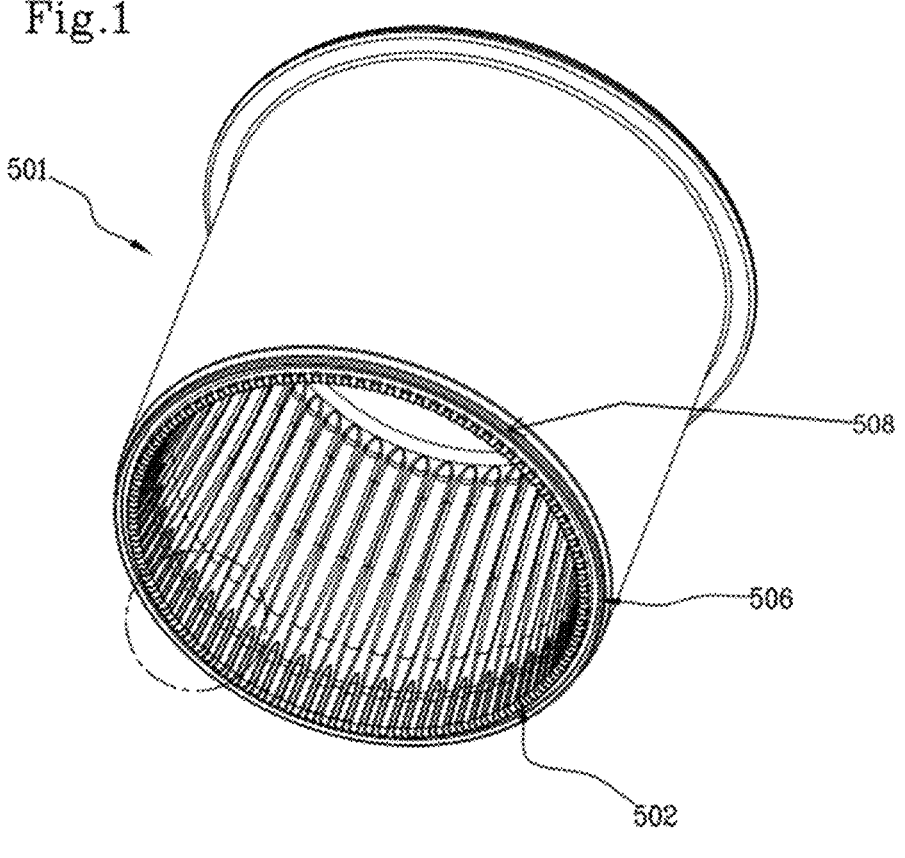
FIG. 1 is a perspective view of a housing element of a dispensing machine for making a beverage from a capsule, with some parts removed for clarity.
Figure 1A:
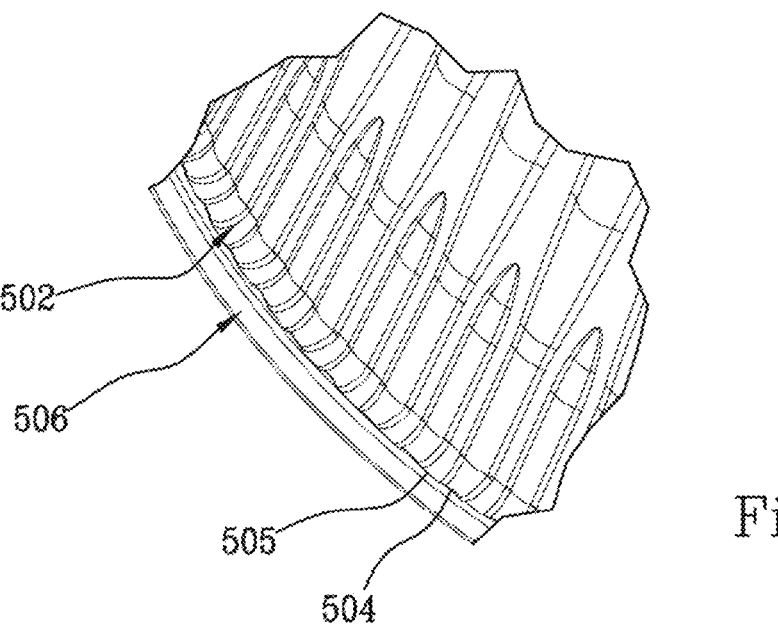
FIG. 1A shows an enlargement of a portion of a sealing edge of the housing element of FIG. 1, which comprises a plurality of crests and grooves alternated circumferentially to define an undulating sealing edge.

As may be noted in FIGS. 1 and 1A, and in more detail in FIGS. 4A and 5A, the sealing edge 502 is equipped with a plurality of radial grooves 504 and radial crests 505.

More in detail, the grooves 504 are open radially and are alternated circumferentially with the crests 505. In other words, the sealing edge 502 is shaped in an undulating fashion.

Advantageously, according to the invention, the radial grooves 504 and the radial crests 505 in the closed configuration before dispensing penetrate, or make contact with a sealing zone 402 of the annular body 401, as shown in FIGS. 4 and 4A.

It should be noted that, in fact, the sealing edge 502 contacts circumferentially the sealing zone 402 not only at the radial crests 505, as shown in the cross-section of FIG. 4 which shows a radial crest 505 of the sealing edge 502 which penetrates into the annular body 401, but also at the radial grooves 504, as shown in the enlargement of FIG. 4A which illustrates with a front view the contact between the sealing edge 502 and the annular body 401.

Advantageously, therefore, before the dispensing when the dispensing machine 5 is in the closed configuration, the fluid-tight seal is already existing since there is a complete circumferential contact between the sealing edge 502 and the annular body 401, both in the radial grooves 504 and in the radial crests 505. Whilst the radial crests 505 penetrate into the annular body 401, the radial grooves 504 make contact with the annular body 401, for sure, and optionally they can also penetrate into it.

During dispensing, as shown in FIGS. 5 and 5A, the radial grooves 504 and the radial crests 505 penetrate even more deeply into the sealing zone 402, so as to improve the fluid-tight seal, when the annular body 401 softens in contact with the water injected by the injection device.

It should be noted that, when the dispensing machine 5 is in the closed configuration, during dispensing, the water fills the space between the housing element 501 and the casing 2 up to the sealing zone 402 and is delimited by the contact between the latter and the sealing edge 502, which prevents the water from escaping, giving rise to fluid leaks.

When the water wets the surface of the cellulose-based material, which is made of fibres, the water can penetrate into the fibres and can therefore soften the annular body 401 which, as it is able to deform more and become more flexible, may allow the sealing edge 502 to penetrate even more in a thickness of the annular body 401.

Thanks to this invention, it is therefore possible to improve the fluid-tight seal of the system comprising the capsule 1 and the dispensing machine 5 since the softening of the annular body 401 made of a cellulose-based material further strengthens the fluid-tight seal, allowing the even deeper penetration of the sealing edge 502 in the annular body 401.

In fact, the outer surface of the annular body 401 may enclose even more the outer surface of the sealing edge 502 in the sealing zone 402, guaranteeing an even greater contact between the sealing edge 502 and the annular body 401.

According to one aspect of this invention, the grammage of the annular body is between 300 gr/m2 and 900 gr/m2, preferably between 600 gr/m2 and 800 gr/m2, preferably equal to 700 gr/m2.

The term "grammage" is used to mean a value of paper and/or paperboard density, which is expressed as a value in grams per square metre.

Even though the paper and/or the paperboard has a thickness which is usually dependent on the grammage used, the thickness of the paper and/or the paperboard may vary depending on various factors, such as, for example, the type of processing performed during the production of the paper and/or the paperboard or the quantity of wood fibre present in it.

In fact, for the same grammage, there may be a high density paper and/or paperboard which has a predetermined thickness and a low density paper and/or paperboard which is thicker than the predetermined thickness.

For this reason, even though the preferred grammage for making the annular body 401 made of paper falls within a range of basic weights as mentioned above, the thickness of the annular body 401 will also be indicated below.

The annular body 401 may comprise a layered structure (not illustrated) which comprises at least an outer layer 4011 based of cellulose and a joining layer 4014 configured to allow the joining of the layered structure to the flanged edge 204.

In other words, the annular body 401 made of paper, or paperboard, which makes the sealing element may be made by means of a single layer of paper and/or paperboard, as shown in FIGS. 2 to 7, and be retained by interference or in addition optionally fixed by means of the joining layer to the flanged edge 204.

Alternatively, the annular body 401 may be made by means of the layered structure made by a plurality of layers, that is to say, the cellulose-based outer layer 4011, positioned towards the outside in contact with the dispensing machine, the joining layer 4014 configured to allow the joining of the layered structure to the flanged edge 204, an inner layer 4013 of cellulose-based material and a further joining layer 4012, the latter joining together the outer layer and the inner layer. The inner layer 4013 is joined to the flanged edge 204 by the joining layer 4014. See FIG. 4, right side.

The annular body 401 may, in other words, be made with a double cellulose-based layer.

The joining layer 4014 may be made of an adhesive material or by a material such as polythene, or a polyolefine, or polyactic acid (PLA) which, when it is applied to the flanged edge 204 becomes sticky and joins the single layer (if the annular body 401 is made by a single layer of cellulose-based material) or the outer layer 4011 and the inner layer 4013 together and also to the flanged edge 204.

The same considerations also apply to the further joining layer 4012 configured to join together the cellulose-based outer layer 4011 and the cellulose-based inner layer 4013.

The joining layer, and optionally the further joining layer may also be made by means of a hot-melt glue which acts when it is activated with heat or activated by ultrasonic sealing.

However, it should be noted that, optionally, the annular body 401 may be held associated with the casing 2 by interference with the lateral wall 202 and/or with the annular bead 205, without the need to be further fixed to the flanged edge 204 by the joining layer, whether the annular body 401 is made of paper, or paperboard, or it is made from the layered structure in two layers joined together by the further joining layer.

Each cellulose-based layer, that is, the outer layer and the inner layer, may have, preferably, a grammage of 350 gr/m2 for a total of 700 gr/m2.

However, thanks to the fact that the annular body 401 may be made using a pair of cellulose-based layers joined to each other, it is possible to select each layer in a suitable manner with regard to the grammage and/or the thickness and/or the degree of hydrophilicity.

For example, the outer layer may be selected with a grammage/thickness/composition different from the inner layer, in such a way that the annular body 401 has the characteristics required for the fluid-tight seal and the hydrophilic properties of the relative outer surface which determines the absorption of water.

Each layer of the pair of layers is preferably planar and of constant thickness in the annular body 401.

According to one aspect of this invention, the thickness of the annular body is between 0.55 mm and 1.10 mm, even more preferably between 0.70 mm and 1.00 mm, preferably 0.90 mm.

In fact, the Applicant has noted, by means of experimental tests, a considerable improvement in the defectiveness of the dispensing due to fluid losses with a thickness of the annular body 401 in the range indicated.

The term "fluid losses" means water leaks from the front and/or rear part of the dispensing machine due to a defect in the fluid-tight seal between the sealing element and the dispensing machine 5 which, with the thickness of the annular body 401 of the dimensions indicated and/or which with the grammage of the cellulose based material may be considerably reduced.

According to one aspect of this invention, from the measurements taken by the Applicant, in the closed configuration before dispensing, the radial crests 505 penetrate in the annular body 401 by at least 0.10 mm.

This guarantees that the radial grooves 504 are at least completely in contact with the annular body 401 and that the fluid-tight seal is guaranteed even before dispensing.

As illustrated in the accompanying drawings, the housing element 501 comprises a free edge 506 which is external and annular and surrounds the outside of the sealing edge 502. The free edge 506 is less protruding along the axis Z than the sealing edge 502 and does not participate in the fluid-tight seal between the housing element 501 and the annular body 401.

It should also be noted that, between the sealing edge 502 and the free edge 506 there is a recess 507 which is annular and has a bottom 507a which, in the closed configuration before dispensing, is at a first distance from the flanged edge 204.

By again performing a measurement at the end of dispensing, it may be noted that between the bottom 507a and the flanged edge 204 is at a second distance, which is less than the first distance.

In other words, the housing element 501 which is subject to the action of the elastic body of the dispensing machine 5, as it continues to compress the annular body 401 made of cellulose, paper and/or paperboard during dispensing, moves closer to the dispensing device of the dispensing machine since the annular body has softened.

Advantageously, for the purpose of the fluid-tight seal, the Applicant has found that the difference between the first distance and the second distance is between 0.010 mm and 0.200 mm.

FIGS. 4A and 5A show that when the radial crests 505 and the radial grooves 504 of the sealing edge 502 penetrate, or make contact with, the sealing zone 402, before dispensing, the latter is compressed and acts in turn in a free zone 403 which is annular, outside the sealing zone 402 and surrounds the sealing zone 402.

The free zone 403 is forced to deform, as a result of the compression of the sealing zone 402, and it swells for the movement of the material with which the annular body 401 is made from the sealing zone 402 to the free zone 403.

Since the material of the annular body 401 is cellulose-based, for example paper or paperboard with a thickness and/or grammage indicated above, and as there are gaps between the cellulose fibres, part of the volume of the sealing zone 402 which is compressed by the sealing edge 502 moves to the free zone 403 and the slight swelling of the free zone 403 may therefore be noted.

The free edge 506 comprises, in known manner, a first annular part at a constant position along the axis Z, which protrudes less with respect to the sealing edge 502 and at least one second annular part which comprises a plurality of radial interruptions 508.

Experimentally, the Applicant has been able to check that in the closed configuration, before dispensing, the first annular part of the free edge 506 is far from the free zone 403, as illustrated in FIG. 4A, but which, on the other hand, may also be in contact with the free zone 403, during dispensing, when the housing element 501 penetrates further into the annular body 401.

However, it has also been found that the radial interruptions 508 never enter into contact with the annular body 401 and they therefore remain spaced from the free zone 403 of the annular body 401. It follows that, whilst an open gap is always present between the radial interruptions 508 and the annular body 401, the free edge 506 of the housing element 501 does not contribute to the fluid-tight seal.

Thanks to the system according to the invention, the Applicant has shown experimentally that it is possible to obtain a fluid-tight seal which, although effective in the closed configuration already prior to dispensing since the radial grooves 504 and the radial crests 505 of the sealing edge 502 are at least in contact with the annular body 401, the radial grooves 504 making contact with or penetrating the annular body 401, the radial crests 505 penetrating the annular body 401. The fluid-tight seal therefore becomes further improved between the dispensing machine 5 and the capsule 1 housed therein, during dispensing, thanks to the fact that the annular body 401 is made of a cellulose-based material which softens and therefore allows the radial grooves 504 and the radial crests 505 to penetrate even more into the annular body 401.

Further, thanks to the material with which the annular body 401 is made, in terms of grammage and/or thickness and/or composition and/or degree of hydrophilicity, it is possible to further improve the fluid seal, selecting the annular body 401 in a suitable manner.

The invention claimed is:

1. A system for producing beverages starting from a capsule through an injection of water under pressure comprising:

a dispensing machine comprising an injection device for supplying water under pressure to the capsule, a housing element configured to house the capsule and a dispensing device for closing the housing element in a closed configuration of the dispensing machine, wherein the housing element comprises an annular sealing edge, which extends about an axis and is configured to contact the capsule in the closed configuration; wherein the capsule comprises a casing, which comprises a base wall and a side wall defining a cavity containing an initial product to be added to water for obtaining the beverage, and a flanged edge extending from said side wall; a covering element, fixed to the flanged edge for closing the cavity; a sealing element, connected to the flanged edge for creating a fluidic seal with the sealing edge in the closed configuration; and wherein the sealing edge includes a plurality of radial open grooves and radial crests which in the closed configuration prior to dispensing penetrate, or contact, a sealing area of the annular body, said grooves and said radial crests penetrating even more deeply into the sealing area during dispensing, so as to improve the fluidic seal, when the annular body is softened in contact with the water injected by the injection device; wherein the sealing element is made as a cellulose-based annular body;

wherein the annular body has a grammage of between 300 gr/m$^2$ and 800 gr/m$^2$.

2. The system according to claim 1, wherein in the closed configuration prior to dispensing, the radial crests penetrate into the sealing area by at least 0.10 mm.

3. The system according to claim 1, wherein the housing element comprises a free edge which is annular, externally surrounds the sealing edge and projects less along the axis with respect to the sealing edge, between the sealing edge and the free edge, an annular recess being present having a bottom which, in the closed configuration prior to dispensing, is at a first distance from the flanged edge, which is greater than a second distance, measured at the end of dispensing; the difference between the first distance and the second distance being comprised between 0.010 mm and 0.200 mm.

4. The system according to claim 3, wherein when the radial grooves and the radial crests of the sealing edge penetrate, or contact, the sealing area, prior to dispensing, the sealing area is compressed and acts in turn in a free area which is annular, external with respect to the sealing area and surrounds the sealing area, the free area being forced to deform and swell for the movement of the material with which the annular body is made from the sealing area to the free area.

5. The system according to claim 4, wherein the free edge comprises at least a first annular part at a constant height along the axis and at least a second annular part comprising a plurality of radial interruptions, and wherein the first annular part is distant from the free area in the closed configuration, prior to dispensing, and is in contact with the free area during dispensing, the plurality of radial interruptions remaining distant from the free area during dispensing.

6. The system according to claim 1, wherein the annular body comprises a single layer of cellulose-based material configured for contacting the dispensing machine.

7. The system according to claim 1, wherein the annular body comprises a stratified structure which comprises at least one cellulose-based outer layer, and a joining layer configured to enable the stratified structure to be joined to the flanged edge.

8. The system according to claim 7, wherein the stratified structure is made through a plurality of layers comprising at least two cellulose-based layers, including the outer layer and an inner layer, wherein the stratified structure additionally comprises a further joining layer for joining the outer layer and the inner layer to each other, the inner layer being joined to the flanged edge by the joining layer.

9. The system according to claim 8, wherein each layer of the annular body is selected appropriately regarding the grammage and/or thickness and/or composition and/or hydrophilicity so that the outer layer is different from the inner layer.

10. The system according to claim 1, wherein the annular body has a thickness of between 0.55 mm and 1.10 mm, to ensure the improvement of the fluidic seal.

11. The system according to claim 1, wherein the annular body has a grammage of between 500 gr/m$^2$ and 800 gr/m$^2$.

12. The system according to claim 1, wherein the annular body has a grammage of between 600 gr/m$^2$ and 800 gr/m$^2$.

13. The system according to claim 1, wherein the annular body has a grammage equal to 700 gr/m$^2$.

14. The system according to claim 1, wherein the annular body has a thickness of between 0.70 mm and 1.00 mm, to ensure the improvement of the fluidic seal.

15. The system according to claim 1, wherein the annular body has a thickness equal to 0.90 mm, to ensure the improvement of the fluidic seal.

16. The system according to claim 1, wherein the sealing element is made of paper or cardboard.

\* \* \* \* \*